(12) United States Patent
Maeda (10) Patent No.: US 11,358,581 B2
(45) Date of Patent: Jun. 14, 2022

(54) CONTROL SYSTEM FOR HYBRID VEHICLE

(71) Applicant: TOYOTA JIDOSHA KABUSHIKI KAISHA, Toyota (JP)

(72) Inventor: Eiji Maeda, Ashigarakami-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 16/446,721

(22) Filed: Jun. 20, 2019

(65) Prior Publication Data
US 2020/0070805 A1 Mar. 5, 2020

(30) Foreign Application Priority Data
Aug. 30, 2018 (JP) .............................. JP2018-161334

(51) Int. Cl.
| | |
|---|---|
| *B60L 9/00* | (2019.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2019.01) |
| *B60W 20/00* | (2016.01) |
| *B60K 6/26* | (2007.10) |

(52) U.S. Cl.
CPC .............. *B60W 20/00* (2013.01); *B60K 6/26* (2013.01); *B60W 2510/0638* (2013.01); *B60W 2510/0657* (2013.01); *B60W 2710/06* (2013.01); *B60W 2710/244* (2013.01); *B60Y 2200/92* (2013.01); *B60Y 2300/192* (2013.01)

(58) Field of Classification Search
CPC ........ B60W 20/00; B60W 2510/0638; B60W 2510/0657; B60W 2710/06; B60W 2710/244; B06K 6/26; B60Y 2200/92; B60Y 2300/192
USPC .......................................................... 701/22
See application file for complete search history.

(56) References Cited

U.S. PATENT DOCUMENTS

| | | | |
|---|---|---|---|
| 5,789,882 A | 8/1998 | Ibaraki et al. | |
| 2002/0107618 A1* | 8/2002 | Deguchi | B60W 50/0097 701/22 |
| 2016/0347304 A1* | 12/2016 | Oyama | B60W 10/08 |
| 2017/0001623 A1* | 1/2017 | Kim | B60W 10/06 |

(Continued)

FOREIGN PATENT DOCUMENTS

| | | |
|---|---|---|
| JP | H09-98516 A | 4/1997 |
| JP | 2015-202807 A | 11/2015 |

*Primary Examiner* — Mahmoud S Ismail
(74) *Attorney, Agent, or Firm* — Oliff PLC (57) ABSTRACT

A control system for a hybrid vehicle configured to reduce fuel consumption. A controller is configured to execute a first determination to determine that a required power is less than a reference power, and a second determination to determine that a condition to start an engine is satisfied. If the answers of the first determination and the second determination are YES, a target power of the engine is set to a predetermined power which is greater than the required power, and which can be generated by consuming smaller amount of fuel. Then, the generator is driven by the engine being operated to achieve the predetermined power, and an electric power generated by the generator to be accumulated in a battery is set to a value calculated based on a difference between the target power and the required power.

4 Claims, 5 Drawing Sheets

(56) References Cited

U.S. PATENT DOCUMENTS

| | | | |
|---|---|---|---|
| 2017/0036663 A1* | 2/2017 | Kim | B60K 6/20 |
| 2017/0050630 A1* | 2/2017 | Park | B60W 20/10 |
| 2017/0066431 A1* | 3/2017 | Kim | B60W 10/08 |
| 2018/0236996 A1 | 8/2018 | Oba et al. | |

* cited by examiner

CONTROL SYSTEM FOR HYBRID VEHICLE

CROSS REFERENCE TO RELATED APPLICATIONS

The present disclosure claims the benefit of Japanese Patent Application No. 2018-161334 filed on Aug. 30, 2018 with the Japanese Patent Office, the disclosure of which are incorporated herein by reference in its entirety.

BACKGROUND

Field of the Disclosure

Embodiments of the present disclosure relate to the art of a control system for a hybrid vehicle comprising an engine that generates power by burning fuel, and a motor that generates drive force for propelling the vehicle.

Discussion of the Related Art

In the hybrid vehicle of this kind, the motor may be activated by electricity generated by driving the engine to propel the hybrid vehicle. In this case, drive force demanded by a driver may be generated only by the motor, therefore, the engine may be operated at the most fuel (or thermal) efficient point irrespective of the drive force demanded by the driver. During deceleration of the hybrid vehicle, electricity may be regenerated by inertia energy of the hybrid vehicle, and the motor may be driven by the regenerated electricity to accelerate the hybrid vehicle. For this reason, fuel efficiency may be further improved. However, the fuel efficiency is reduced when the engine has not yet been warmed up, or when the engine is operated at a low speed and under a low load or high load condition. In those situations, the electricity is generated by driving the motor by the engine while consuming larger amount of the fuel. Such electricity generated at high specific fuel consumption is also accumulated in a battery. For this reason, fuel efficiency may be reduced if the vehicle is propelled by the motor while supplying the electricity accumulated in the battery to the motor, compared to a case of propelling the vehicle by the engine.

JP-A-2015-202807 describes a vehicle control apparatus for improving fuel economy of a hybrid vehicle. According to the teachings of JP-A-2015-202807, a fuel consumption required to generate electric power to charge a battery is integrated, and a specific fuel consumption of the battery as a fuel consumption per unit power is calculated based on the integrated value of the fuel consumption and an electric energy. Further, a current fuel consumption required to generate the unit power during propulsion is calculated as a specific fuel consumption of the engine. The control apparatus taught by JP-A-2015-202807 is configured to compare the specific fuel consumption of the battery with the specific fuel consumption of the engine, and to select an operating mode of the hybrid vehicle from a motor mode and an engine mode (or hybrid mode) in such a manner as to reduce the specific fuel consumption of the hybrid vehicle during propulsion. According to the teachings of JP-A-2015-202807, therefore, fuel economy and energy efficiency of the hybrid vehicle can be improved.

Thus, the control apparatus described in JP-A-2015-202807 is configured to reduce cost of energy for propelling the hybrid vehicle converted into a unit price of the fuel as much as possible. However, given that the specific fuel consumption to charge the battery is high, fuel economy will be diminished when propelling the vehicle by the electricity accumulated in the battery. In other words, energy efficiency will be reduced. That is, according to the teachings of JP-A-2015-202807, it is possible to select the energy generated by consuming smaller amount of fuel to propel the vehicle. According to the teachings of JP-A-2015-202807, however, specific fuel consumption to generate the electricity accumulated in the battery to be consumed to propel the vehicle may not be reduced.

SUMMARY

Aspects of embodiments of the present disclosure have been conceived noting the foregoing technical problems, and it is therefore an object of the present disclosure to provide a control system for a hybrid vehicle configured to reduce fuel consumption by reducing specific fuel consumption to charge an electric storage device.

The control system according to the exemplary embodiment of the present disclosure is applied to a hybrid vehicle comprising: an engine that generates a torque by burning fuel, wherein an operating point governed by a speed and an output torque can be shifted while maintaining an output power; a generator that is driven by the engine to generate electricity; an electric storage device that is charged by the electricity generated by the generator; and a drive motor to which the electricity is supplied from the electric storage device to generate a torque for propelling the hybrid vehicle. The control system comprises a controller that controls the operating point of the engine and a charging amount of the electric storage device. In order to achieve the above-explained objective, according to the exemplary embodiment of the present disclosure, the controller is configured to: execute a first determination to determine that a required power by a driver to propel the hybrid vehicle is less than a predetermined reference power; execute a second determination to determine that a condition to start the engine is satisfied; set a target power of the engine to a predetermined power which is greater than the required power by the driver, and which can be generated by consuming smaller amount of fuel compared to an amount of the fuel consumed to generate the required power by the driver, in a case that answers of both of the first determination and the second determinations are affirmative; operate the generator by the engine being operated to achieve the predetermined power; and set an electric power generated by the generator to be accumulated in the electric storage device to a value calculated based on a difference between the target power and the required power by the driver.

In a non-limiting embodiment, the controller may be further configured to calculate a specific fuel consumption of the electric storage device as an amount of fuel consumption per unit amount of the electricity accumulated in the electric storage device, based on the electricity accumulated in the electric storage device and an amount of the fuel consumed to generate the electricity accumulated in the electric storage device. Further, the condition to start the engine may include a fact that the specific fuel consumption of the electric storage device is greater than a predetermined generation judgment value.

In a non-limiting embodiment, the controller may be further configured to select a most fuel efficient point of the engine being operated to generate the predetermined power from the available operating points possible to achieve the predetermined power.

According to the exemplary embodiment of the present disclosure, when the required power by a driver is less than the reference power, the engine is operated in such a manner as to achieve the target power irrespective of the required power by a driver. As described, the engine generates a torque by burning the fuel, and energy efficiency of the engine is improved, in other words, the fuel consumption is reduced when generating a power greater than a predetermined magnitude. That is, in order to reduce the fuel consumption, the engine is operated at an operating point at which the energy efficiency is high even if the required power by the driver is small. In this case, the engine will generate power greater than the required power by the driver, and the generator is driven by the excessive power of the engine. The electricity generated by the generator is accumulated in the electric storage device. In this situation, therefore, the electricity can be generated by driving the generator by operating the engine at the operating point where the fuel efficiency is good. That is, the electric storage device can be charged with the electricity generated by consuming small amount of the fuel. For this reason, the specific fuel consumption of the electric storage device can be reduced. According to the exemplary embodiment of the present disclosure, the hybrid vehicle is propelled by operating the motor or an assist driving motor by the electricity generated while reducing fuel consumption. Consequently, fuel consumption of the hybrid vehicle can be reduced.

The control system according to the exemplary embodiment of the present disclosure may be further configured to control the output power of the engine and the charging of the electric storage device when the specific fuel consumption of the electric storage device is greater than the generation judgment value. Therefore, the electric storage device can be charged with the electricity generated by operating in a fuel efficient manner, and the hybrid vehicle can be propelled by the electricity using the electricity accumulated in the electric storage device. In other words, the generator can be prevented from being operated to generate electricity in a situation where the specific fuel consumption is large, therefore, it is possible to avoid excessive and frequent generation of electricity.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Preferred embodiments of the present disclosure will now be explained with reference to the accompanying drawings.

For example, the control system according to the embodiment of the present disclosure may be applied to a parallel hybrid vehicle, a series-parallel hybrid vehicle, a series hybrid vehicle. In the hybrid vehicle, a generator is driven by an engine to generate electricity, and the electricity generated by the generator may not only be accumulated in an electric storage device, but also be supplied to a motor to propel the vehicle. The motor may also be operated as a generator to regenerate electricity thereby charging the electric storage device.

Figure 1:
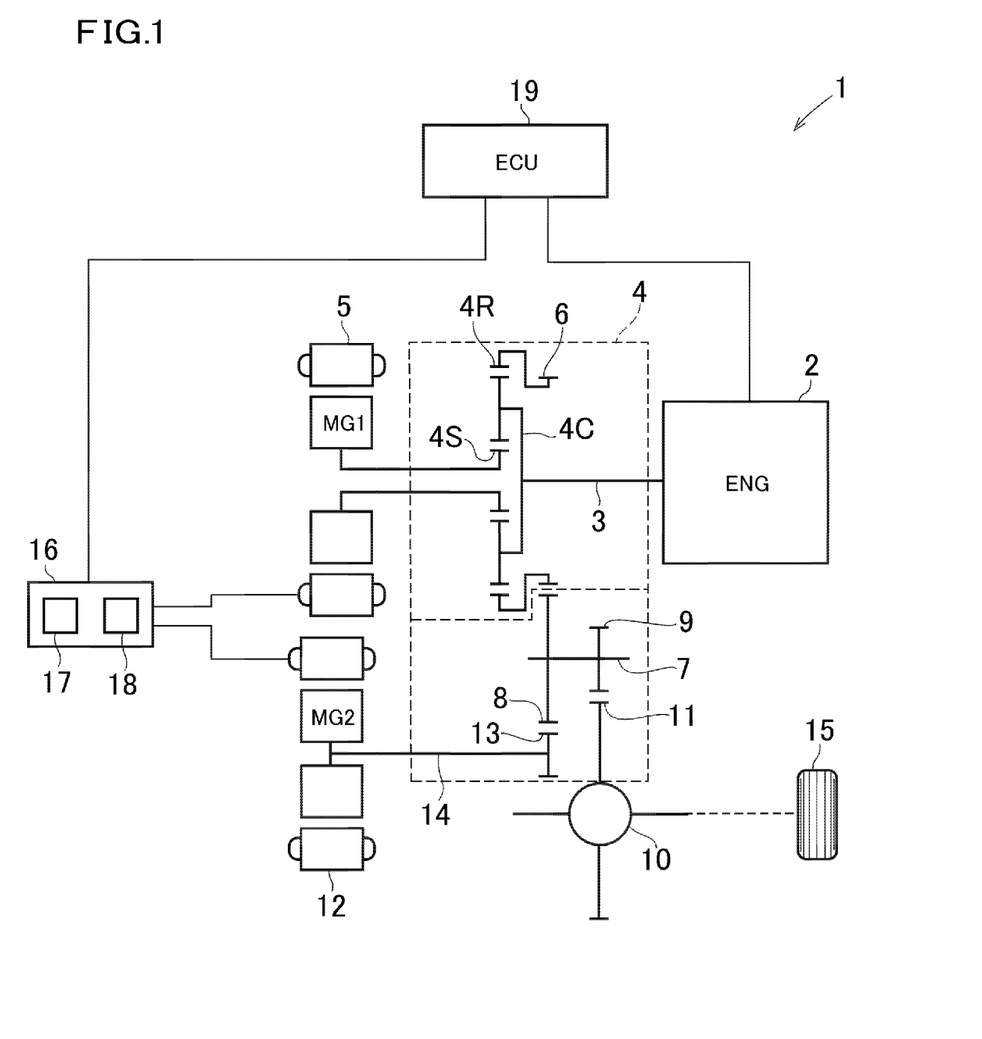
FIG. 1 is a schematic illustration showing one example of a structure of a hybrid vehicle to which the control system according to the exemplary embodiment of the present disclosure is applied.

Referring now to FIG. 1, there is shown one example of a structure of the hybrid vehicle (as will be simply called the "vehicle" hereinafter) 1 having a two-motor drive unit to which the control system is applied. In the vehicle 1, an output shaft 3 of an engine (referred to as "ENG" in FIG. 1) 2 is connected to a power split mechanism 4. The engine 2 is an internal combustion engine that generates torque by burning fuel, and for example, a gasoline engine and a diesel engine may be adopted as the engine 2. An output power of the engine 2 is controlled by electrically controlling air intake and fuel injection.

The power split mechanism 4 is a differential mechanism that performs a differential action among an input element, an output element, and a reaction element to split an output torque of the engine 2 into a torque to be used to propel the vehicle 1 and a torque to generate electricity. For example, a single-pinion planetary gear unit may be employed as the power split mechanism 4. Specifically, the power split mechanism 4 comprises: a sun gear 4S that is connected to a first motor (referred to as "MG1" in FIG. 1) 5, a ring gear 4R that is formed integrally with an output gear 6; a plurality of planetary gears interposed between the sun gear 4S and the ring gear 4R; and a carrier C that is connected to the output shaft 3 of the engine 2 and that supports the planetary gears in a rotatable manner. Accordingly, in the power split mechanism 4, the sun gear 4S serves as the reaction element, the ring gear 4R serves as the output element, and the carrier 4C serves as the input element.

The first motor 5 is a motor-generator serving as a "generator" of the embodiment of the present disclosure. Specifically, the first motor 5 is operated as a motor by supplying electricity to generate a positive torque to rotate the sun gear 4S in the forward direction (i.e., in the rotational direction of the engine 2) or the reverse direction (i.e., in the counter direction to the rotational direction of the engine 2). When the first motor 5 serves as a generator, the first motor 5 generates a negative torque in the direction to stop a rotation of the sun gear 4S.

A countershaft 7 extends parallel to a common rotational axis of the engine 2 and the power split mechanism 4. A driven gear 8 is formed on one end of the countershaft 7 while being meshed with the output gear 6, and a drive gear 9 is formed on the other end of the countershaft 7 while being meshed with a ring gear 11 of a differential gear unit 10 as a final reduction unit. The drive gear 9 is diametrically smaller than the driven gear 8 and the ring gear 11. That is, the countershaft 7, the driven gear 8, and the drive gear 9 serve as a speed reducing mechanism.

The vehicle 1 further comprises a second motor (referred to as "MG2" in FIG. 1) 12, and it is preferable to use a motor-generator as the second motor 12. A drive gear 13 that is diametrically smaller than the driven gear 8 is fitted onto a rotor shaft 14 of the second motor 12 to be meshed with the driven gear 8. Therefore, a drive torque generated by the second moor 12 can be distributed to each drive wheel 15 through the speed reducing mechanism and the differential gear unit 10, and the second motor 12 can be driven as a generator by a torque delivered from the drive wheel 15.

The first motor 5 and the second motor 12 are electrically connected with a motor controller (MCU) 16. The motor controller 16 comprises an inverter 17 and an electric storage device (as will be also called the "battery" hereinafter) 18. That is, the first motor 5 and the second motor 12 are electrically connected with each other through the motor controller 16. Therefore, electricity may be transmitted between the first motor 5 and the second motor 12 through the battery 18.

The vehicle 1 is provided with an electronic control unit (to be abbreviated as the "ECU" hereinafter) 19 as a controller to control the engine 2, the first motor 5, and the second motor 12. A main constituent of the ECU 19 is a microcomputer. The ECU 19 is configured to perform a calculation based on data transmitted from various sensors (not shown) and installed in the ECU 19, and transmits a calculation result in the form of command signal. For example, the ECU 19 controls startup and stop of the engine 2, an amount of fuel injection to the engine 2, and air intake to the engine 2. Further, the ECU 19 controls an output torque and a speed of each of the first motor 5 and the second motor 12 in both cases in which the motor 5, 12 is operated as a motor and in which the motor 5, 12 is operated as a generator. The ECU 19 controls the engine 2, the first motor 5, and the second motor 12 in accordance with a running condition of the vehicle 1. To this end, for example, the ECU 19 receives data about a vehicle speed, a depression of an accelerator pedal (not shown) representing a power required by the driver, an amount of fuel injection, a power consumption of each of the first motor 5 and the second motor 12, a generation amount of each of the first motor 5 and the second motor 12, a state of charge level (to be abbreviated as "SOC" hereinafter) of the battery 18.

Figure 2:
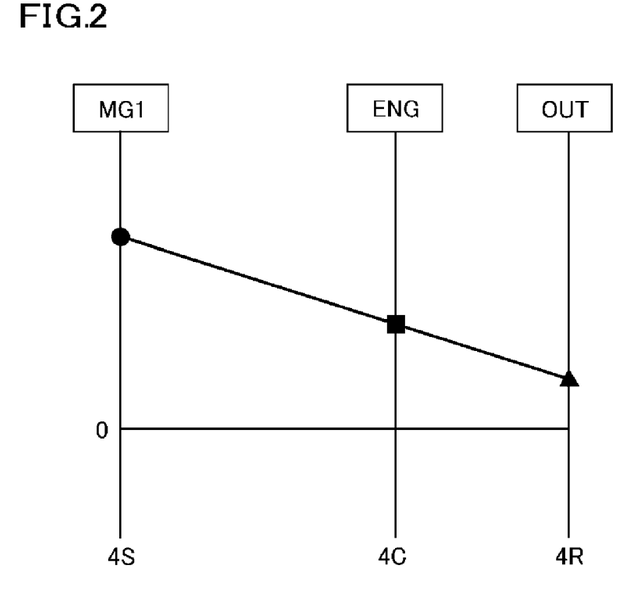
FIG. 2 is a nomographic diagram showing rotational speeds of rotary elements of a planetary gear unit.

Rotational speeds of the sun gear 4S, the ring gear 4R, and the carrier 4C of the power split mechanism 4 are governed by a gear ratio of the power split mechanism 4 between teeth number of the sun gear 4S and teeth number of the ring gear 4R. Accordingly, a rotational speed or an operating point of the engine 1 may be controlled by controlling a rotational speed of the sun gear 4S. FIG. 2 is a nomographic diagram showing rotational speeds of the rotary elements of the power split mechanism 4 in a hybrid mode (as will be called the "HV mode" hereinafter) in which the engine 2 is activated and the first motor 5 is operated as a generator. In this situation, the engine 2 connected to the carrier 4C is rotated in the forward direction to output a torque, and the first motor 5 is rotated in the forward direction while establishing a negative torque. That is, the first motor 5 is rotated by an output torque of the engine 5 to be operated as a generator. Consequently, the ring gear 4R as an output element is rotated in the forward direction to output the torque of the engine 2. That is, the rotational speed of the engine 2 is increased by increasing the rotational speed of the first motor 5, and the rotational speed of the engine 2 is reduced by reducing the rotational speed of the first motor 5. The operating point of the engine 2 may be shifted while maintaining an output power of the engine 2 by controlling an air intake to the engine 2 while controlling the rotational speed of the engine 2.

Figure 3:
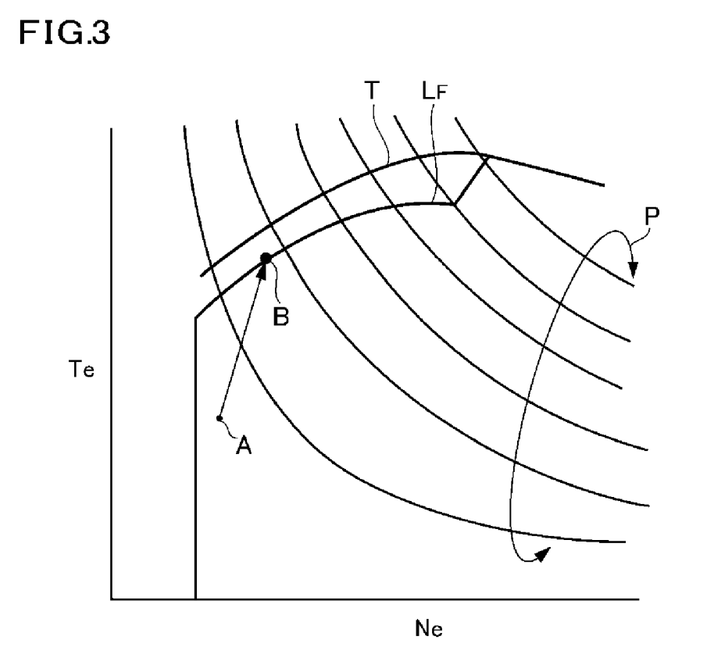
FIG. 3 is a map determining a most fuel efficient point based on an engine torque and an engine speed.

Turning to FIG. 3, there is shown one example of a map determining constant output curves P of the engine 2 and an optimum fuel economy curve LF. In the map shown in FIG. 3, the vertical axis represents an engine torque Te, and the horizontal axis represents an engine speed Ne. The optimum fuel economy curve LF is determined by conducting operation test of the engine 2 to measure fuel consumption at each operating point, and connecting feasible most fuel efficient points of the engine 2. Since a lowest limit speed of the engine 2 is an idling speed, the optimum fuel economy curve LF extends vertically at around the idling speed. In FIG. 3, the letter "T" represents a maximum torque curve.

Thus, fuel consumption characteristic of the engine 2 is determined as indicated in FIG. 3. For example, an operating point of the engine 2 during normal running is determined by the following procedures. Given that a gasoline engine is adopted as the engine 2, an output torque of the engine 2 is changed according to an opening degree of a throttle valve (not shown) governed by a depression of the accelerator pedal (i.e., an air intake). In this case, therefore, a required output power is calculated based on a current vehicle speed and a depression of the accelerator pedal, and a target engine speed at which the required output power thus calculated can be achieved while optimizing fuel consumption is determined with reference to the map shown in FIG. 3. Then, a target torque is calculated based on the required output power and the target engine speed thus determined. As described, a speed of the engine 2 can be controlled by the first motor 5. In order to achieve the target engine speed, therefore, a speed of the first motor 5 is controlled in such a manner as to adjust the speed of the engine 2 to the target speed. On the other hand, an output torque of the engine 2 is changed according to an air intake. In order to achieve the target torque, therefore, an opening degree of the throttle valve of the engine 2 is controlled in such a manner as to adjust the output torque of the engine 2 to the target torque. Thus, the operating point of the engine 2 is determined in accordance with the power required by the driver, and the engine 2 is operated at the operating point thus determined. Specifically, in the HV mode, the operating point of the engine 2 is basically shifted along the optimum fuel economy curve LF.

When the speed (or operating point) of the engine 2 is controlled by the above-explained procedures, the first motor 5 serves as a generator, and electricity generated by the first motor 5 is supplied to the second motor 12 to operate the second motor 12 as a motor thereby generating a drive torque. As described, in the HV mode, the engine 2 is activated to generate power, and the speed of the engine 2 is controlled by the first motor 5. In the HV mode, therefore, an output torque of the engine 2 is partially delivered to the drive wheels 15 via the power split mechanism 4, the speed reducing mechanism, and the differential gear unit 10. The remaining output torque of the engine 2 is temporarily translated into electric power by the first motor 5, and translated into the drive torque again by the second motor 12 to be delivered to the drive wheels 15.

In the HV mode, when the SOC level of the battery 18 is low, or when an output power of the engine 2 is increased to achieve a required acceleration, the electricity generated by the first motor 5 is accumulated in the battery 18. The vehicle 1 may also be propelled in an electric vehicle mode (to be abbreviated as the "EV mode" hereinafter) in which the engine 2 is stopped and the second motor 12 is operated as a motor by the electricity supplied from the battery 18. When the SOC level of the battery 18 drops during propulsion in the EV mode, the engine 2 is started to drive the first motor 5, and electricity generated by the first motor 5 is supplied to the second motor 12 and accumulated in the battery 18. During deceleration of the vehicle 1, the second motor 12 is rotated by torque delivered from the drive wheels 15 to serve as a generator, and electricity generated by the second motor 12 is accumulated in the battery 18. That is, the electricity is regenerated.

In order to propel the vehicle 1, at least any one of the engine 2 and the second motor 12 is operated as a prime mover. The electricity accumulated in the battery 18 to be consumed to operate the second motor 12 as a prime mover is generated by propelling the vehicle 1, operating the engine 2, or regenerating energy. That is, the electricity accumulated in the battery 18 may be converted into an amount of fuel consumption of the engine 2. In the following explanation, the amount of the fuel consumed to generate the electricity accumulated in the battery 18, more specifically, an amount of fuel consumption per unit amount of the electricity accumulated in the battery 18 (g/kWh) will be called the "specific fuel consumption" of the battery 18. For example, the electricity accumulated in the battery 18 may be calculated by integrating a difference between a charging amount to the battery 18 and a discharging amount from the battery 18. Instead, the electricity accumulated in the battery 18 may also be obtained electrically based e.g., on a voltage between terminals. On the other hand, the fuel consumption corresponding to the electricity accumulated in the battery 18 may be calculated by subtracting an integrated value of an amount of the fuel consumed to propel the vehicle 1 and to activate an auxiliary such as an air conditioner from an integrated value of an amount of the fuel injected in the engine 2.

The electricity accumulated in the battery 18 includes: electricity generated by driving the engine 2; electricity regenerated by the first motor 5 and the second motor 12; electricity generated by operating the engine 2 at an operating point where energy efficiency is high; and electricity generated by operating the engine 2 at an operating point where energy efficiency is low. Therefore, the specific fuel consumption of the battery 18 is changed sequentially. Besides, a cost of the electricity itself may also be employed as a parameter to evaluate a cost to charge the battery 18. However, the present disclosure has been conceived to reduce fuel consumption, and emission of exhaust gas and global warming gas (or global greenhouse gas). According to the present disclosure, therefore, the specific fuel consumption is employed as a parameter to evaluate a cost to charge the battery 18.

The control system according to the embodiment of the present disclosure is configured to evaluate the electricity of the battery 18 and an operating condition of the engine 2 based on the specific fuel consumption, and to select the operating mode of the vehicle 1 based on the specific fuel consumption. An example of the routine to be executed by the ECU 19 to select the operating mode based on the specific fuel consumption is shown in FIG. 4.

Figure 4:
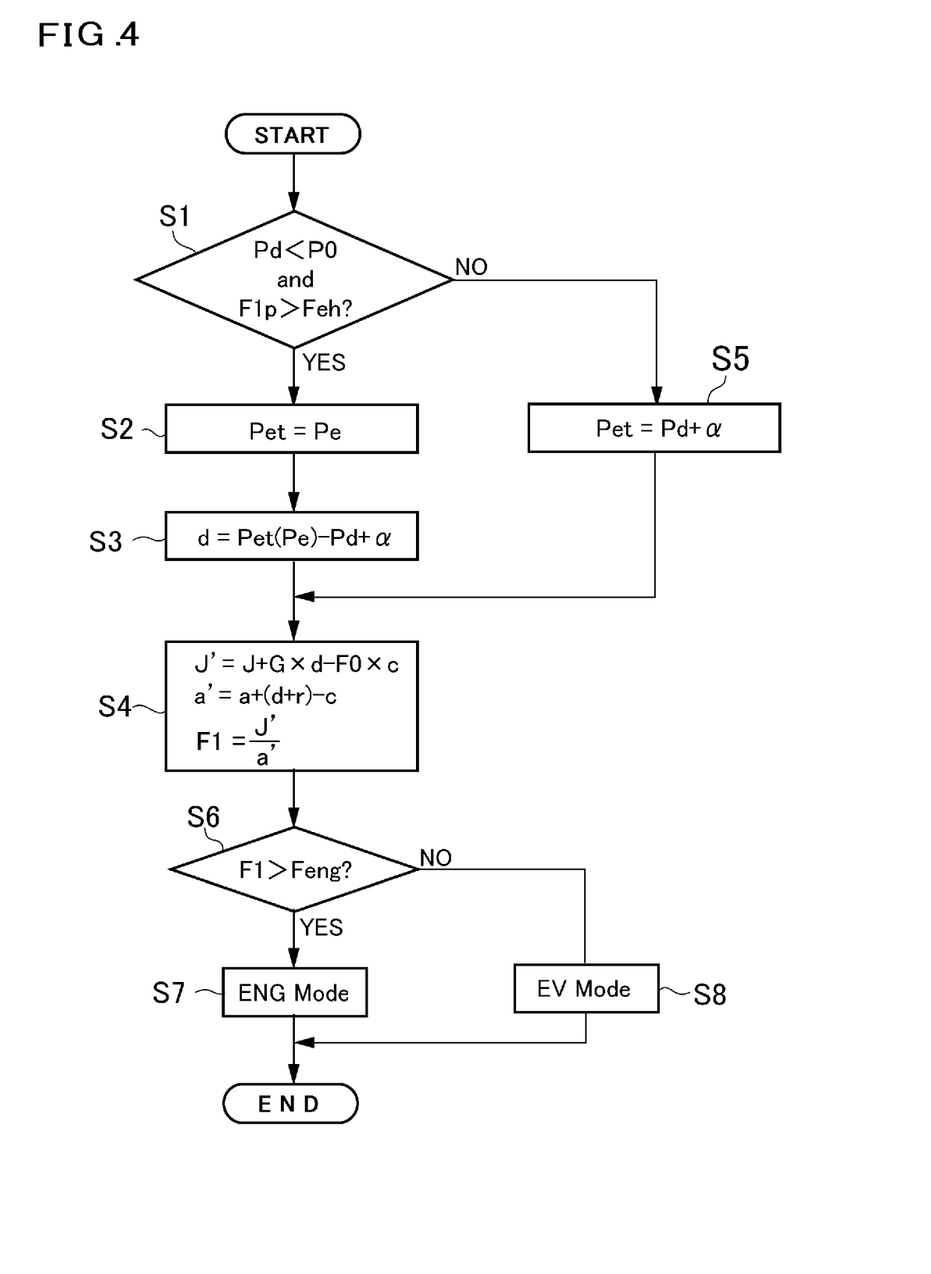
FIG. 4 is a flowchart showing an example of a routine executed by the control system according to the exemplary embodiment of the present disclosure.

The routine shown in FIG. 4 is executed when launching and stopping the vehicle 1 repeatedly at a low speed (under low load). That is, the routine shown in FIG. 4 is started under a condition in which the engine 2 is stopped. It is to be noted that the engine 2 is started when an opening degree of the accelerator being increased to launch the vehicle 1 exceeds a threshold value to shift the operating mode from the EV mode to the HV mode.

At step S1, it is determined whether a required power Pd by the driver is less than a predetermined reference power P0, and whether a specific fuel consumption F1p of the battery 18 immediately before a point at which the determination at step S1 is made is greater than a predetermined generation judgment value FEH. Such determination about the required power Pd by the driver corresponds to a first determination of the embodiment, and determination about the specific fuel consumption F1p of the battery 18 corresponds to a second determination of the embodiment. In the routine shown in FIG. 4, a first condition is satisfied if the required power Pd by the driver is less than the reference power P0, and a second condition is satisfied if the specific fuel consumption F1p of the battery 18 is greater than the generation judgment value FEH.

For example, the required power Pd by the driver may be calculated based on a vehicle speed and a depression of the accelerator pedal. Here, when the vehicle 1 is stopped, the required power Pd by the driver may be calculated based on a depression of the accelerator pedal. The reference power P0 as a threshold value of a magnitude of the required power Pd is set to a value possible to determine an increase in fuel consumption or specific fuel consumption, in other words, a reduction in the energy efficiency, given that the engine 2 is operated in such a manner as to achieve the required power Pd. For example, if the engine 2 is operated under the load lower than a predetermined value, the operating point of the engine 2 will be deviated away from the optimum fuel economy curve LF, and consequently the fuel consumption will be increased. That is, the reference power P0 is a criterion value for determining a fact that the engine 2 is operated in such a condition where the fuel consumption is increased under the low load. For example, the reference power P0 may be determined based on a result of a driving test or simulation.

As described, the specific fuel consumption F1p of the battery 18 may be calculated based on the electricity accumulated in the battery 18 and an amount of the fuel consumed to generate the electricity accumulated in the battery 18. The generation judgment value FEH as a threshold value of the specific fuel consumption F1p is a criterion value for avoiding excessive and frequent generation of electricity. Specifically, the generation judgment value FEH is set in such a manner as to reduce the specific fuel consumption of the battery 18 by generating electricity in an efficient manner, only when the specific fuel consumption of the battery 18 is increased gradually. A value of the generation judgment value FEH may be set arbitrarily depending on a design of the vehicle 1. Instead, the generation judgment value FEH may also be set based on a result of a driving test or simulation taking account of an operating point of the engine 2.

If both of the first condition and the second condition are satisfied so that the answer of step S1 is YES, the routine progresses to step S2 to set a target power Pet for controlling an output power of the engine 2 to a predetermined power Pe. Specifically, the predetermined power Pe is set to a value greater than the required power Pd by the driver, at which the engine 2 is allowed to be operated at an operating point on the optimum fuel economy curve LF, or at an operating point determined based on the optimum fuel economy curve LF to reduce fuel consumption. The ECU 19 is configured to select the most fuel efficient point of the engine 2 being operated to generate the predetermined power Pe from the available operating points possible to achieve the predetermined power Pe. Here, the optimum fuel economy curve LF differs depending on specification of the vehicle 1 such as a displacement of the engine 2, therefore, the predetermined power Pe is set for each model and grade of the vehicle 1 based on result of a driving test or simulation.

If the engine 2 is operated in such a manner as to achieve the target power Pet thus determined, the engine 2 will generate power greater than the required power Pd that is excessive to propel the vehicle 1. In this case, therefore, the routine further progresses to step S3 to set an electric power d to be generated by the first motor 5 based on an excess power generated by the engine 2 corresponding to a difference between the target power Pet and the required power Pd. Specifically, the electric power d to be generated by the first motor 5 is calculated by adding a correction value a to the difference between the target power Pet and the required power Pd, as expressed by the following expression:

$$d=Pet-Pd+\alpha$$

where $\alpha$ is the correction value including an add-subtract value determined depending on a temperature and a required electric power to activate auxiliaries such as an air conditioner and a headlamp.

Then, a specific fuel consumption F1 of the battery 18 (g/kWh) after generating electric power by the first motor 5 is calculated at step S4. At step S4, first of all, a battery energy after charging the battery 18 is converted into an amount of the fuel J' (g). Specifically, the amount of the fuel J' (g) corresponding to the energy accumulated in the battery 18 after charging the battery 18 is calculated by adding an increase in an amount of the fuel converted from the electric energy increased as a result of charging the battery 18 to an amount of the fuel J converted from the electric energy accumulated in the battery 18 just before charging the battery 18, and subtracting a reduction in an amount of the fuel converted from to the electric energy reduced as a result of discharging electricity from the battery 18 from the amount of the fuel J. To this end, the increase in the amount of the fuel corresponding to the electric energy increased as a result of charging the battery 18 is calculated by multiplying a specific fuel consumption G (g/kWh) of the engine 2 during generation of the first motor 5 by the electric power d to be generated by the first motor 5 (G·d). Specifically, the specific fuel consumption G of the engine 2 during generation is an amount of the fuel consumed to generate a unit amount of the electricity by the first motor 5 that is calculated taking account of generation efficiency. Accordingly, the specific fuel consumption G of the engine 2 may be expressed as:

$$G=\text{specific fuel consumption of engine} \cdot 1/(\text{generation efficiency of } MG1) \cdot 1/(\text{charging efficiency of battery}).$$

On the other hand, the reduction in the amount of the fuel corresponding to the electric energy reduced as a result of discharging electricity from the battery 18 is calculated by multiplying a previous value F0 of the specific fuel consumption of the battery 18 when discharging electricity from the battery 18 by an output power c (kWh) from the battery 18. In other words, the previous value F0 of the specific fuel consumption of the battery 18 is a value of the specific fuel consumption of the battery 18 before charging the battery 18. Accordingly, the amount of the fuel J' corresponding to the energy accumulated in the battery 18 after charging the battery 18 may be expressed as:

$$J'=J+G \cdot d-F0 \cdot c.$$

Then, an integrated value a' of a battery power is calculated by adding the electric power d and a regenerated electric power r to an integrated value a of the battery power before charging the battery 18, and subtracting the output power (i.e., a discharged electricity) c from the integrated value a of the battery power before charging the battery 18, as expressed by the following expression:

$$a'=a+(d+r)-c.$$

Then, the specific fuel consumption F1 of the battery 18 after charging the battery 18 is calculated by dividing the amount of the fuel J' by the integrated value a' of the battery power as expressed by the following expression:

$$F1=J'/a'.$$

Otherwise, if the answer of step S1 is NO, the routine progresses to step S5 to set the target power Pet for controlling the engine 2 based on a power required to operate the vehicle 1. Specifically, the power required to operate the vehicle 1 includes the required power Pd by the driver governed by a depression of the accelerator pedal, and the correction value a corresponding to the required electric power to activate auxiliaries. That is, the target power Pet will not be increased greater than the required power Pd by the driver. In this case, accordingly, the target power Pet may be expressed as the following expression:

$$Pet=Pd+\alpha.$$

Specifically, the answer of step S1 will be NO in a case that the required power Pd by the driver is greater than the reference power P0, or that the specific fuel consumption F1p of the battery 18 is smaller than the generation judgment value FEH. That is, the answer of step S1 will be NO in a case that the answer of at least one of the first determination and the second determination is NO. In the case that the answer of the first determination is NO, the engine 2 is operated under a comparatively high-load. That is, the specific fuel consumption of the engine 2 will not be increased excessively, and hence it is not necessary to raise the operating point of the engine 2 to a high-power side. In this case, therefore, the routine progresses to step S5 to set the target power Pet based on the required power Pd by the driver. Otherwise, in the case that the answer of the second determination is NO, the specific fuel consumption of the battery 18 is not so large and it is not necessary to charge the battery 18 aggressively. In this case, therefore, the first motor 5 will not generate electricity excessively.

Then, the routine also progresses to step S4 to calculate the specific fuel consumption F1 of the battery 18 after generating electric power by the first motor 5. The specific fuel consumption F1 of the battery 18 thus calculated is used to select the operating mode of the vehicle 1. To this end, a specific fuel consumption FENG of the engine 2 expected in the case of operating the engine 2 in accordance with an acceleration demand to e.g., launch the vehicle 1 is calculated at step S6. Then, at step S6, it is determined whether the specific fuel consumption FENG of the engine 2 is less than the specific fuel consumption F1 of the battery 18. If the answer of step S6 is YES, the routine progresses to step S7 to select the operating mode in which the vehicle 1 is powered by the engine 2 (e.g., the HV mode), and thereafter returns. In this case, an amount of the fuel consumed to propel the vehicle 1 is reduced so that emission of exhaust gas and global warming gas is reduced. By contrast, if the answer of step S6 is NO, the routine progresses to step S8 to select the EV mode in which the second motor 12 is operated as a motor by the electricity supplied from the battery 18, and thereafter returns. In this case, an amount of the fuel consumed to propel the vehicle 1 is reduced compared to the case of operating the engine 2 so that emission of exhaust gas and global warming gas is reduced.

Figure 5:
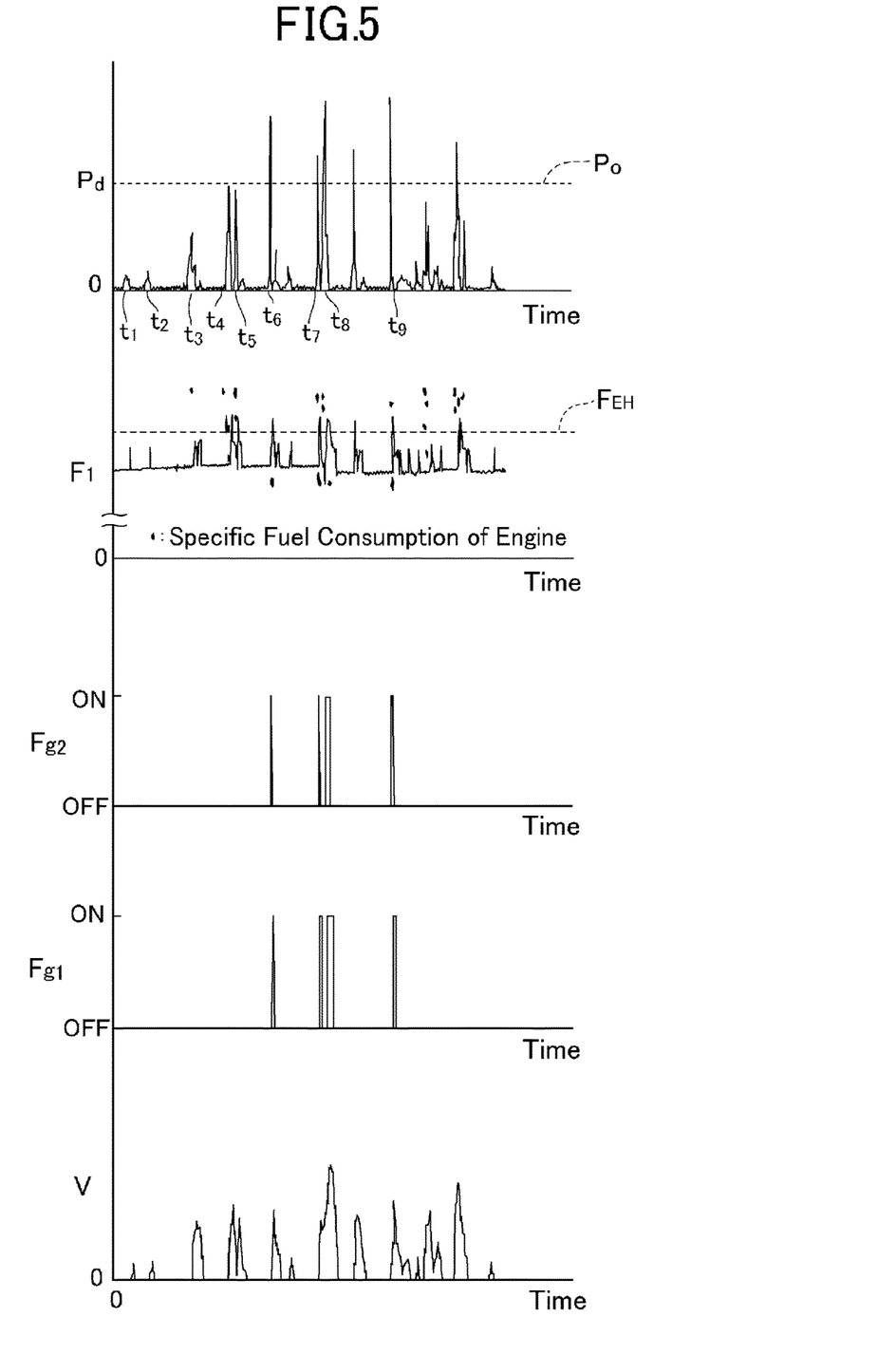
FIG. 5 is a time chart showing temporal changes in the output power of the engine and a charging situation of a battery during propulsion in an urban area.

Next, advantages to be achieved by executing the above-explained routine will be explained hereinafter. FIG. 5 shows changes in the output power of the engine 2 and the charging status of the battery 18 when travelling in an urban area. When travelling in the urban area, the vehicle 1 is repeatedly stopped, launched, and propelled at a low speed. In this situation, the driver operates the accelerator pedal and the brake pedal frequently and repeatedly in accordance with a movement of a vehicle ahead. Consequently, the required power Pd by the driver is changed frequently and widely, and a vehicle speed V is also changed frequently and widely. When the vehicle 1 is stopped and the required power Pd (or depression of the accelerator pedal) is small, the vehicle 1 is launched in the EV mode by operating the second motor 12. In this situation, if the accelerator pedal is depressed deeper than a predetermined value, the engine 2 is started to increase the drive force and the operating mode is shifted to an engine mode or the HV mode.

In the example shown in FIG. 5, at point t1 and point t2, the required power Pd is small and hence the EV mode is selected. Then, at point t3, the required power Pd is increased from that at points t1 and t2. In this situation, in order to achieve the required power Pd by the engine 2, the engine 2 is operated at a low speed under low load and hence the specific fuel consumption of the engine 2 is large. On the other hand, the specific fuel consumption F1 of the battery 18 is increased temporarily but has not yet exceeded the generation judgment value FEH. In this situation, therefore, the above-explained control to raise the target power Pet to the predetermined power Pe will not be executed. That is, an engine power increasing flag Fg1 shown in FIG. 5 will not be turned on. Likewise, the above-explained control to increase a generation amount at step S3 will not be executed. That is, a generation amount increasing flag Fg2 shown in FIG. 5 will not be turned on. Thus, in the situation where the specific fuel consumption F1 of the battery 18 is not so large below the generation judgment value FEH, the first motor 5 will not be operated aggressively to generate electricity by the output power of the engine 2. In this situation, therefore, the electricity will not be generated excessively by the first motor 5. Such situation is continued at points t4 and t5.

Then, when the required power Pd by the driver is increased at point t6 to launch the vehicle 1, the specific fuel consumption F1 of the battery 18 exceeds the generation judgment value FEH. In this situation, if the required power Pd is less than the reference power P0, the answer of step S1 will be YES. That is, both of the first condition and the second condition are satisfied. Consequently, the engine power increasing flag Fg1 and the generation amount increasing flag Fg2 are turned on. As a result, the target power Pet of the engine 2 is raised to the predetermined power Pe and the engine 2 is started. Then, as explained at step S3, the electric power d to be generated by the first motor 5 is set to the value based on the difference between the target power Pet and the required power Pd.

Turning back to FIG. 3, there is shown a change of the operating point in the situation where the target power Pet of the engine 2 is thus raised to the predetermined power Pe. In this situation, since the required power Pd by the driver is small, the operating point of the engine 2 is situated at point A which is deviated away from the optimum fuel economy curve LF to the low speed and low torque side. If the engine 2 is operated at point A, the specific fuel consumption of the engine 2 will be increased, and if the first motor 5 is driven as a generator by the engine 2, the specific fuel consumption of the battery 18 will be increased. By contrast, if the target power Pet is set to the predetermined power Pe, the operating point of the engine 2 is shifted to point B on the optimum fuel economy curve LF. In this situation, the operating point is not necessarily to be shifted exactly to the optimum fuel economy curve LF, and may be deviated slightly from the optimum fuel economy curve LF depending on the condition of the vehicle 1. Thus, according to the embodiment of the present disclosure, the target power Pet of the engine 2 is set to a value greater than the required power Pd by the driver. For this reason, the specific fuel consumption of the engine 2 can be reduced. In addition, the first motor 5 is operated to generate electricity by operating the engine 2 in a condition where the specific fuel consumption is small. For this reason, fuel consumption to generate the electricity to be accumulated in the battery 18 can be reduced.

Turning back to FIG. 5, at each point t7, t8, and t9, the specific fuel consumption F1 of the battery 18 also exceeds the generation judgment value FEH to launch or accelerate the vehicle 1, and the required power Pd is also less than the reference power P0. In those situations, therefore, the control executed at point t6 is also executed. Specifically, the engine power increasing flag Fg1 and the generation amount increasing flag Fg2 are turned on so that the target power Pet of the engine 2 is raised to the predetermined power Pe, and the electric power is generated aggressively by the first motor 5 based on the difference between the target power Pet and the required power Pd. If the required power Pd by the driver is increased between those points of time to launch or accelerate the vehicle 1, the specific fuel consumption F1 of the battery 18 is not raised higher than the generation judgment value FEH. In this situation, therefore, the engine power increasing flag Fg1 and the generation amount increasing flag Fg2 are maintained to be off. That is, the control to raise the target power Pet of the engine 2 to the predetermined power Pe by starting the engine 2, and the control to increase the generation amount will not be executed. Instead, the control at step S4 is executed in this case.

Figure 6:
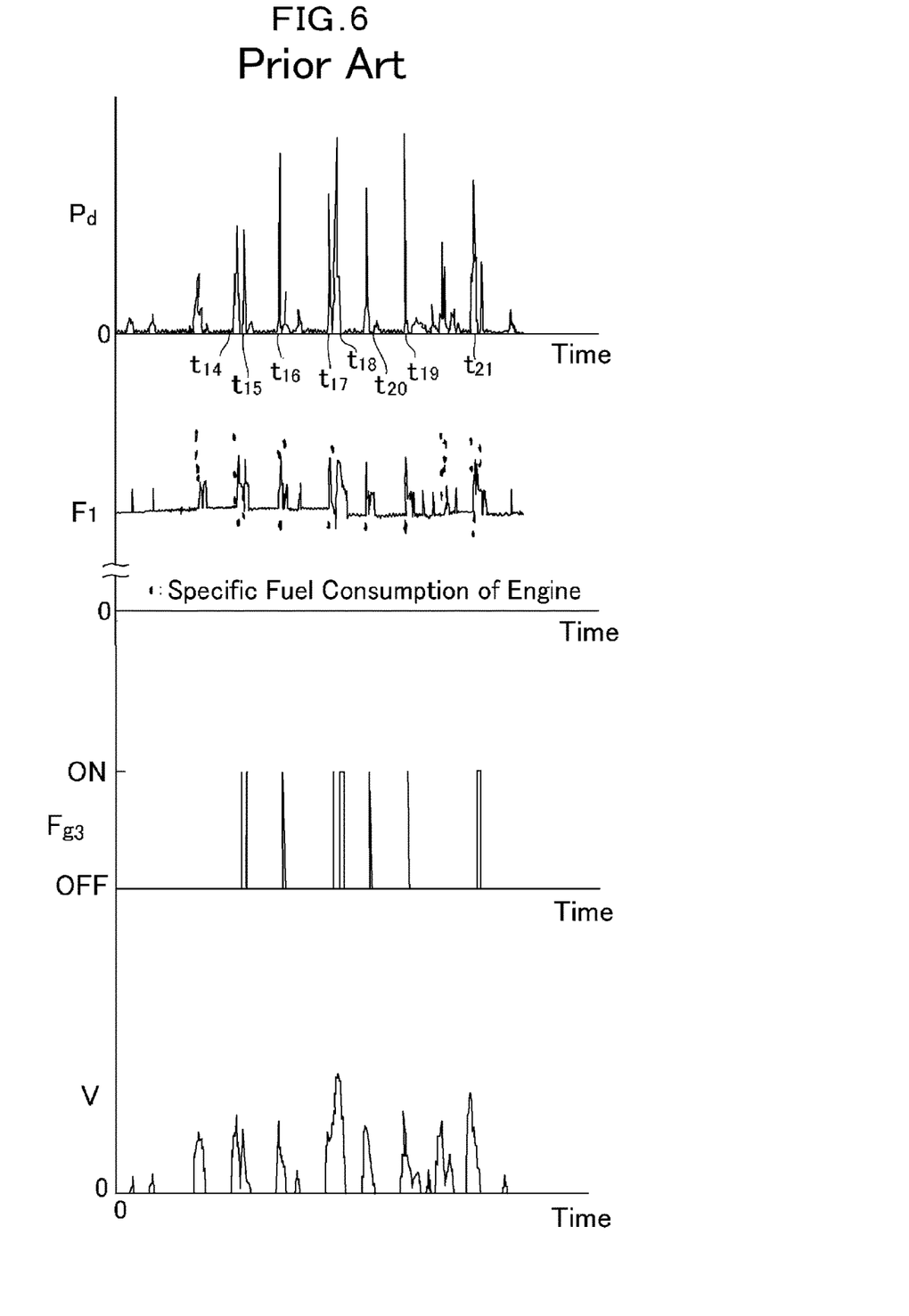
FIG. 6 is a time chart a time chart showing temporal changes in conditions of the engine controlled by the conventional art during propulsion in an urban area.

Turning to FIG. 6, there is shown a comparative example in which the vehicle travels in the urban area without executing the routine shown in FIG. 4. In the example shown in FIG. 6, the required power Pd by the driver, the vehicle speed V, and the specific fuel consumption F1 of the battery 18 are changed in a manner similar to the example shown in FIG. 5. However, since the routine shown in FIG. 4 is not executed, the engine 2 is started in accordance with an increase in the required power Pd. Specifically, at point t14 and point t15 in the example shown in FIG. 6 corresponding to point t4 and point t5 in the example shown in FIG. 5, the required power Pd is increased to a certain extent, and an engine activating flag Fg3 is turned on to start the engine 2. In this situation, an output torque of the engine 2 is delivered to the first motor 5 thereby driving the first motor 5 to generate electricity. However, the engine 2 is operated under low-load in this situation, therefore, the specific fuel consumption of the engine 2 and the specific fuel consumption F1 of the battery 18 are increased. Then, at point t16 corresponding to point t6 in FIG. 5, the required power Pd is also increased and the engine 2 is started. In this situation, however, the engine 2 is started as a result of increase in the required power Pd (i.e., in the depression of the accelerator pedal) without taking account of the specific fuel consumption F1 of the battery 18.

In the example shown in FIG. 6, points t17, t18, and t19 correspond respectively to the points t7, t8, and t9 in the example shown in FIG. 5, and the above-explained situation also occurs at points t17, t18, and t19. Further, in the example shown in FIG. 6, the required power Pd is also increased at point t20 between the points t18 and t19, and the engine activating flag Fg3 is turned on to start the engine 2. In the example shown in FIG. 6, however, the engine 2 will not be started and the output power of the engine 2 will not be increased to a value greater than the required power Pd based on a fact that the specific fuel consumption F1 of the battery 18 is smaller than the generation judgment value FEH. Such situation also occurs at point t21. Thus, according to the conventional art, the engine is started when the required power Pd is increased to a predetermined value. According to the conventional art, therefore, the engine is operated also in the condition where the specific fuel consumption is large, and the electricity is generated using the output power of the engine thus operated while consuming larger amount of fuel. That is, the battery is charged with the electricity generated by consuming large amount of fuel, and hence the fuel economy may not be improved.

According to the embodiment of the present disclosure, when the engine 2 is operated under low-load where the specific fuel consumption is large in the condition in which the specific fuel consumption F1 of the battery 18 is greater than the generation judgment value FEH, the target power Pet of the engine 2 is raised to a value possible to reduce the specific fuel consumption, and the first motor 5 is operated as a generator to generate electricity by the output power of the engine 2. According to the embodiment of the present disclosure, therefore, the engine 2 is allowed to be operated in an optimally fuel efficient manner to reduce the specific fuel consumption F1 of the battery 18. For this reason, fuel economy of the vehicle 1 can be improved, and emission of exhaust gas and global warming gas can be reduced.

According to the embodiment of the present disclosure, since power generation of the first motor 5 and charging of the battery 18 are executed while increasing the output power of the engine 2 greater than the required power Pd by the driver, percentage of the output power of the engine 2 converted into the electric power on the way to the drive wheels 15 is increased. Consequently, power transmission efficiency is reduced by such electric conversion. According to the embodiment of the present disclosure, however, improvement of the energy efficiency by reducing the specific fuel consumption exceeds such reduction in the power transmission efficiency. For this reason, the energy efficiency of the vehicle 1 can be improved.

Although the above exemplary embodiments of the present disclosure have been described, it will be understood by those skilled in the art that the present disclosure should not be limited to the described exemplary embodiments, and various changes and modifications can be made within the scope of the present disclosure. For example, the control system according to the embodiment of the present disclosure may also be applied to a hybrid vehicle having a one-motor drive unit.

What is claimed is:

1. A control system for a hybrid vehicle, comprising:
an engine that generates a torque by burning fuel, wherein an operating point governed by a speed and an output torque can be shifted while maintaining an output power;
a generator that is driven by the engine to generate electricity;
an electric storage device that is charged by the electricity generated by the generator; and
a drive motor to which the electricity is supplied from the electric storage device to generate a torque for propelling the hybrid vehicle;
wherein the control system comprises a controller that controls the operating point of the engine and a charging amount of the electric storage device, and
the controller is configured to
execute a first determination to determine that a required power by a driver to propel the hybrid vehicle is less than a predetermined reference power,
execute a second determination to determine that a condition to start the engine is satisfied,
set a target power of the engine to a predetermined power which is greater than the required power by the driver, and which can be generated by consuming smaller amount of fuel compared to an amount of the fuel consumed to generate the required power by the driver, in a case that answers of both of the first determination and the second determinations are affirmative,
operate the generator by the engine being operated to achieve the predetermined power, and
set an electric power generated by the generator to be accumulated in the electric storage device to a value calculated based on a difference between the target power and the required power by the driver.

2. The control system for the hybrid vehicle as claimed in claim 1,
wherein the controller is further configured to calculate a specific fuel consumption of the electric storage device as an amount of fuel consumption per unit amount of the electricity accumulated in the electric storage device, based on the electricity accumulated in the electric storage device and an amount of the fuel consumed to generate the electricity accumulated in the electric storage device, and
the condition to start the engine includes a fact that the specific fuel consumption of the electric storage device is greater than a predetermined generation judgment value.

3. The control system for the hybrid vehicle as claimed in claim 1, wherein the controller is further configured to select a most fuel efficient point of the engine being operated to generate the predetermined power from the available operating points possible to achieve the predetermined power.

4. The control system for the hybrid vehicle as claimed in claim 2, wherein the controller is further configured to select a most fuel efficient point of the engine being operated to generate the predetermined power from the available operating points possible to achieve the predetermined power.

* * * * *